July 16, 1968  D. E. SMITH ET AL  3,393,152
COMPOSITION OF MATTER AND METHODS OF MAKING SAME
Filed Aug. 3, 1965

INVENTORS
DONALD E. SMITH
PALMER W. TOWNSEND

BY Edmund W Bopp
Agent

United States Patent Office 3,393,152
Patented July 16, 1968

3,393,152
COMPOSITION OF MATTER AND METHODS
OF MAKING SAME
Donald E. Smith, Warren Township, Plainfield, and Palmer W. Townsend, Florham Park, N.J., assignors to Air Reduction Company, Incorporated, New York, N.Y., a corporation of New York
Filed Aug. 3, 1965, Ser. No. 476,915
14 Claims. (Cl. 252—67)

ABSTRACT OF THE DISCLOSURE

The invention relates to a novel composition of matter comprising solid carbon dioxide particles suspended in a cryogenic liquid having a boiling temperature below about —300° F. at atmospheric pressure, and the unique method of making the same which includes introducing carbon dioxide into the cryogenic liquid in such a way that the solid particles form.

---

Figure 1:
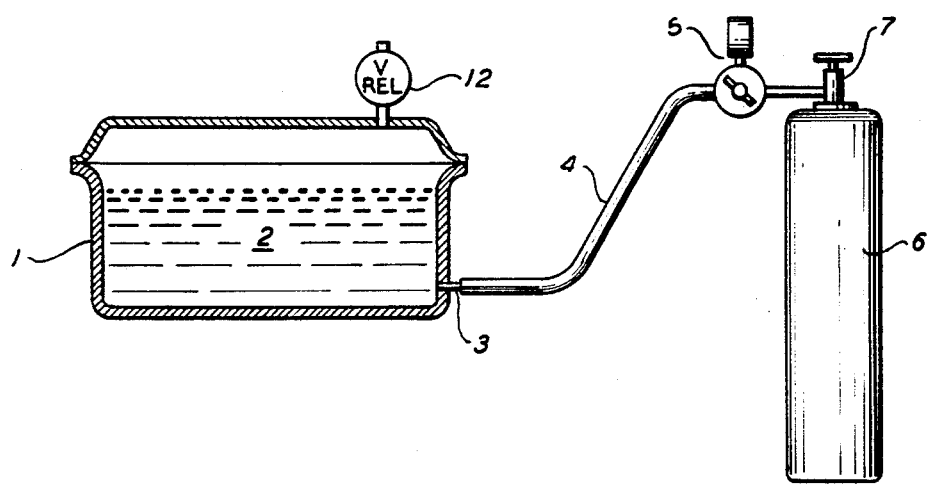

This invention relates to a novel composition of matter and to methods of manufacture of such product. More particularly it relates to a novel cryogen and to the preparation of same.

In accordance with the present invention finely divided solid phase carbon dioxide is dispersed in liquid nitrogen or other cryogenic liquid, preferably as a suspension therein. The proportion of solid $CO_2$ in the liquid may vary over a wide range to form a product that varies from a thick creamy substance, not unlike whipped cream, to a free flowing substance having watery characteristics and resembling milk in appearance.

In the preferred form of the invention liquid nitrogen is the cryogenic liquid in which the finely divided solid carbon dioxide is suspended, although liquid air, liquid argon and in fact any liquefied gas or mixture of gases having a boiling temperature at atmospheric pressure below about —300° F. can be used. Cryogenic liquids having boiling temperatures substantially warmer than —300° F. have been found unsuitable because in such liquids the carbon dioxide particles tend to adhere to one another and form a solidified mass of solid $CO_2$. The novel composition of matter is characterized by its high refrigeration capacity and its fluid characteristics which enable it to be stored in tanks and transported by pump and pipe.

The refrigeration capacity of the novel composition falls within a range that extends from the refrigeration capacity of solid $CO_2$ to that of liquid nitrogen (assuming it is the liquid used), the particular B.t.u. per pound capacity of each suspension depending upon the percentage content of $CO_2$. The refrigeration capacity of nitrogen warmed from —320° F. in the liquid phase to +50° F. in the gaseous phase is approximately 180 B.t.u. per pound. The corresponding refrigeration capacity of $CO_2$ warmed from —110° F. in the solid phase to +50° F. in the gaseous phase is approximately 279 B.t.u. per pound. If the solid $CO_2$ has its temperature lowered to that of liquid nitrogen, its cooling capacity rises to approximately 309 B.t.u. per pound. Therefore a suspension containing 50% $CO_2$ by weight will have a refrigeration capacity between —320° F. and +50° F. of $$\frac{180+309}{2}$$

or 245 B.t.u. per pound. Refrigeration capacities of other suspensions with different percentages of nitrogen and $CO_2$ can be calculated by the use of the following formula:

Refrigeration capacity=180X+309Y B.t.u. lb. wherein X equals the fractional content of nitrogen and Y equals the fractional content of $CO_2$. If a different liquid vehicle is employed, the two numbers have to be changed to represent the refrigeration capacity of the liquid used and the refrigeration capacity of the solid $CO_2$ particles at the temperature of the new liquid, although this should not be significantly different as a requirement on the liquid is that it have a boiling temperature not substantially warmer than —300° F.

This invention contemplates solid $CO_2$ particles subcooled by dispersion of the particles in a cryogenic fluid such as liquid nitrogen in all percentages of $CO_2$ by weight, and more particularly contemplates such dispersions in which the solid $CO_2$ consists of from 5% to 95% of the total weight. It is apparent that for very low percentages of $CO_2$ the resultant dispersion would not have a refrigeration capacity significantly higher than that of the liquid agent alone. As an example, a 5% concentration of $CO_2$ by weight in liquid nitrogen results in a refrigeration capacity of 186 B.t.u. per pound, which is only 6 B.t.u. per pound higher than straight liquid nitrogen. It is therefore desirable, when the refrigeration capacity of the fluid is important, to employ higher $CO_2$ concentrations, preferably above 40%.

The novel composition of solid $CO_2$ dispersed in a cryogenic liquid can be prepared by any of a number of methods. In FIGURE 1 there is illustrated a simple apparatus that is capable of producing the novel cryogenic fluid. A pressure tank 1 is filled to a substantial depth with liquid nitrogen 2. At some point below the surface of the nitrogen there is an inlet 3 into the tank which is adapted for affixing a hose 4 on the portion external to the tank. A pressure relief valve 12 prevents the build-up of excessive pressure. The hose 4 leads through pressure regulator 5 to a valve 7 which is connected to a supply of $CO_2$ gas contained in cylinder 6. The inlet 3 may be of various sizes, ranging from fractions of an inch to over an inch, with no significant effect on the resulting suspension.

To produce the suspension valve 5 is opened to permit the flow of $CO_2$ gas through hose 4 to inlet 3. The $CO_2$ will be solidified upon contacting the nitrogen and form small particles of an average size of the order of 1 micron. The tank 1 may be maintained at atmospheric pressure and the $CO_2$ may be injected at slightly above atmospheric pressure to overcome the pressure of the liquid nitrogen at the opening into the tank. The composition of the resultant suspension is a function of the amount of $CO_2$ which is permitted to pass through inlet 3, which in turn is dependent upon the size of the inlet, the rate of $CO_2$ flow, and the duration of time the valve 7 is open.

A variation of the above-described method of preparation is to substitute a source of liquid $CO_2$ for the compressed gas cylinder 6. By maintaining the pressure in tank 1 above the $CO_2$ triple point pressure of 60.4 pounds per square inch gauge liquid $CO_2$ can be injected directly into the liquid nitrogen with substantially the same result. As a matter of fact $CO_2$ is commonly distributed in cylinders in liquid phase with the head space in the cylinder containing compressed gas. Whether liquid or gas is drawn from the cylinder depends only on whether it is drawn from the bottom or top of the cylinder.

Figure 2:
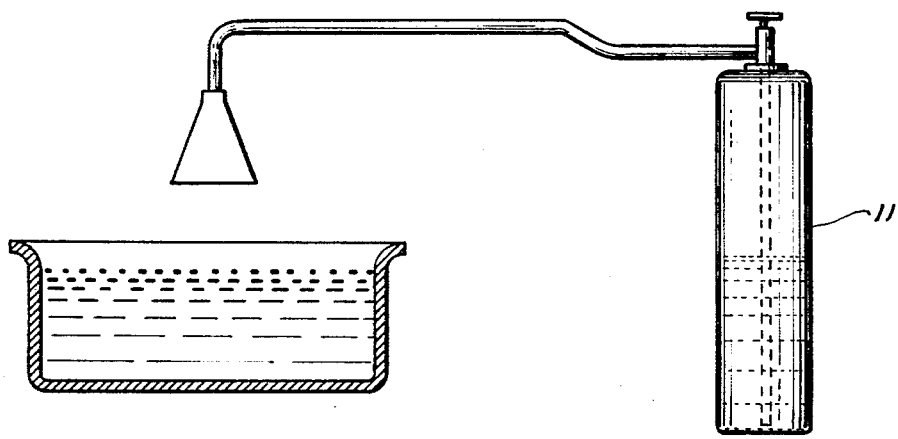

Another method of preparation of the novel composition is by expanding liquid $CO_2$ into the atmosphere, preferably in a horn as shown in FIG. 2, to produce $CO_2$ snow which falls directly into liquid nitrogen becoming dispersed therein by gravity or with the aid of mechanical agitation. In FIG. 2 the source of liquid $CO_2$ is depicted as cylinder 11 from which liquid is drawn through the dip tube which extends close to the bottom of the cylinder.

While this is a satisfactory method of producing the product it has been found that the suspension thus formed is somewhat less stable than the suspension formed by the previously described methods, probably because the $CO_2$ particles are somewhat larger than in the last described method.

The novel composition comprising finely divided solid $CO_2$ particles dispersed in liquid nitrogen or like cryogenic liquid is useful as a refrigerant and for other purposes. Its high refrigeration capacity (ability to absorb heat, for example expressed as B.t.u. per pound) exceeds that of any suitable cryogenic liquid such as liquid nitrogen, argon or $N_2O$. In addition it has the advantage of being able to be stored, handled, transported and dispersed with the ease and simplicity of a liquid. In the final evaporation as a result of the absorption of heat, the liquid nitrogen will evaporate first leaving the solid $CO_2$ behind which then sublimes at a somewhat higher temperature leaving no residue. The novel composition is also useful as a source of inert gas, as well as a cooling medium and as such has utility in diverse fields such as welding and blow molding. It is also useful as a source of high pressure gas for use in the treatment of oil wells. Other advantages and uses will be apparent to those skilled in the arts in which cryogenic fluids and solids are now known to be useful.

We claim:

1. A refrigerant composition consisting essentially of finely divided particles of carbon dioxide in solid phase dispersed in a cryogenic liquid selected from the group consisting of liquid nitrogen, liquid air, liquid argon, or mixtures thereof, said carbon dioxide constituting from 5%–95% by weight of the composition.

2. A refrigerant composition consisting essentially of solid carbon dioxide in particulate form dispersed in a liquefied gas having a boiling temperature at atmospheric pressure not substantially warmer than —300° F., said carbon dioxide constituting from 5%–95% by weight of the composition.

3. A refrigerant composition consisting essentially of solid carbon dioxide in particulate form dispersed in liquid nitrogen, said carbon dioxide constituting from 5%–95% by weight of the composition.

4. A refrigerant composition consisting essentially of solid carbon dioxide in particulate form dispersed in liquid argon, said carbon dioxide constituting from 5%–95% by weight of the composition.

5. A refrigerant composition consisting essentially of solid carbon dioxide in particulate form dispersed in liquid air, said carbon dioxide constituting from 5%–95% by weight of the composition.

6. A composition of matter consisting essentially of a suspension of solid carbon dioxide particles in liquid nitrogen, said particles being of the order of one micron in size, said carbon dioxide constituting from 5%–95% by weight of the composition.

7. A composition having cryogenic refrigeration capacity consisting essentially of solid carbon dioxide in particulate form dispersed in cryogenic liquid having a boiling temperature not substantially warmer than —300° F. at atmospheric pressure, said solid carbon dioxide being present in an effective amount sufficient to enhance the refrigeration capacity of the cryogenic liquid.

8. The composition defined in claim 7 in which the cryogenic liquid comprises liquid nitrogen.

9. The composition defined in claim 7 in which the cryogenic liquid comprises liquid argon.

10. The composition defined in claim 7 in which the cryogenic liquid comprises liquid air.

11. The method of making a composition having cryogenic refrigeration capacity which comprises, injecting carbon dioxide in fluid phase into a cryogenic liquid having a boiling temperature at atmospheric pressure not substantially warmer than —300° F., the amount of carbon dioxide injected being sufficient to enhance the refrigeration capacity of the cryogenic liquid.

12. The method of dispersing an effective amount of solid phase carbon dioxide in a cryogenic liquid having a boiling temperature not substantially warmer than —300° F. at atmospheric pressure comprising, the steps of expanding liquid carbon dioxide and directing the resulting carbon dioxide snow into said cryogenic liquid, the amount of snow directed into said cryogenic liquid being sufficient to enhance the refrigeration capacity of the cryogenic liquid.

13. The method of claim 12 in which the cryogenic liquid comprises liquid nitrogen.

14. The method of introducing an effective amount of solid phase carbon dioxide into a cryogenic liquid having a boiling temperature not substantially warmer than —300° F. at atmospheric pressure comprising, injecting carbon dioxide in fluid phase into said liquid under pressure, the amount of carbon dioxide injected being sufficient to enhance the refrigeration capacity of the cryogenic liquid.

References Cited
UNITED STATES PATENTS

| | | | |
|---|---|---|---|
| 2,176,289 | 10/1939 | Beebe | 62—167 X |
| 2,968,161 | 1/1961 | Bliss | 62—45 |
| 3,225,825 | 12/1965 | Lewis | 62—45 X |

LEON D. ROSDOL, *Primary Examiner.*

S. D. SCHWARTZ, *Assistant Examiner.*